United States Patent [19]

Winters et al.

[11] Patent Number: 5,486,344

[45] Date of Patent: Jan. 23, 1996

[54] METHOD OF PRODUCING CHLORINE DIOXIDE

[75] Inventors: John R. Winters, Marietta; John M. Gray, Roswell; Joel D. Tenney, Atlanta, all of Ga.

[73] Assignee: Eka Nobel Inc., Marietta, Ga.

[21] Appl. No.: 895,634

[22] Filed: Jun. 9, 1992

[51] Int. Cl.⁶ .................................................. C01B 11/02
[52] U.S. Cl. ........................... 423/477; 423/478; 204/95
[58] Field of Search ................................. 423/477, 478; 204/101, 103, 95

[56] References Cited

U.S. PATENT DOCUMENTS

| | | | |
|---|---|---|---|
| 2,332,181 | 10/1943 | Soule | 423/477 |
| 2,811,420 | 10/1957 | Pernert | 423/477 |
| 2,833,624 | 5/1958 | Sprauer | 423/478 |
| 3,810,969 | 5/1974 | Schlumberger | 423/478 |
| 4,129,484 | 12/1978 | Larsson | 423/478 |
| 4,683,039 | 7/1987 | Twardowski et al. | 204/95 |
| 4,798,715 | 1/1989 | Hardee et al. | 423/478 |
| 4,806,215 | 2/1989 | Twardowski | 423/478 |
| 4,915,927 | 4/1990 | Lipsztajn et al. | 204/103 |
| 5,084,148 | 1/1992 | Kazcur et al. | 204/95 |
| 5,091,166 | 2/1992 | Engström et al. | 423/478 |
| 5,091,167 | 2/1992 | Engström et al. | 423/478 |
| 5,106,465 | 4/1992 | Kaczur et al. | 423/477 |
| 5,108,560 | 4/1992 | Cawlfield et al. | 204/103 |

FOREIGN PATENT DOCUMENTS

| | | |
|---|---|---|
| 0009839 | 4/1980 | European Pat. Off. . |
| 0473559 | 3/1992 | European Pat. Off. . |
| 0473560 | 3/1992 | European Pat. Off. . |
| WO91/12356 | 8/1991 | WIPO . |
| WO92/03374 | 3/1992 | WIPO . |

OTHER PUBLICATIONS

Rapson, Howard; The Mechanism of Formation of $ClO_2$ From Sodium Chlorate; TAPPI; Aug. 1956; vol. 39, #8, pp. 554–556.

Primary Examiner—Benjamin R. Fuller
Assistant Examiner—Valerie Ann Lund
Attorney, Agent, or Firm—Leydig, Voit & Mayer

[57] ABSTRACT

The invention relates to a method of producing chlorine dioxide, which method comprises reacting chloric acid with hydrogen peroxide as a reducing agent in such proportions that chlorine dioxide is produced.

8 Claims, No Drawings

METHOD OF PRODUCING CHLORINE DIOXIDE

BACKGROUND OF THE INVENTION

The present invention relates to a method of producing chlorine dioxide. The method comprises reacting chloric acid with hydrogen peroxide as a reducing agent.

Chlorine dioxide used in aqueous solution is of considerable commercial interest, mainly in pulp bleaching, but also in water purification, fat bleaching, removal of phenols from industrial wastes etc. It is therefore desirable to provide processes in which chlorine dioxide can be efficiently produced.

There are numerous different processes for chlorine dioxide production. Most processes in commercial use involves reaction of sodium chlorate in an acidic medium with a reducing agent such as chloride ions, methanol or sulfur dioxide. The acidity is generally provided by sulfuric acid. A drawback of the known processes is the formation of some form of sodium sulfate as a by-product which has to be removed from the reactor, either in the form of a solid saltcake or as waste acid.

Chlorine dioxide can also be produced from chloric acid ($HClO_3$), involving the advantage that no sodium sulfate by-product is produced.

Chloric acid can be prepared by ion exchange such as described in, for example, U.S. Pat. Nos. 3,810,969 and 4,798,715, or by electrolyses of alkali metal chlorate such as described in, for example, U.S. Pat. No. 4,915,927. Chloric acid can also be prepared by treating barium chlorate with sulfuric acid and concentrating the dilute chloric acid obtained by evaporation. The disclosures of the above patents are incorporated herein by reference.

International patent application WO 91/12356 (corresponding to U.S. Pat. No. 5,084,148), the disclosure of which is incorporated herein by reference, describes a process of producing chloric acid by electrolysing alkali metal chlorate in a divided cell, alkali metal hydroxide, oxygen gas and hydrogen gas being obtained as a valuable by-products. It is said that the chloric acid can serve as a raw material in commercial processes for producing chlorine dioxide, using chloride, sulfur dioxide or methanol as a reducing agent.

International patent application WO 92/03374 discloses a process which involves partly converting alkali metal chlorate to chloric acid by electrolyses, feeding a chlorine dioxide reactor with the mixture, and recycling the chlorate to the electrochemical cell. The chlorine dioxide is produced electrochemically or with methanol as a reducing agent.

Electrochemical production of chlorine dioxide gives comparatively low current efficiency as well as chemical efficiency. Moreover, the potential for chlorine dioxide decomposition is always present and thus a hazard to sensitive and expensive electrochemical cell equipment.

A draw back of using methanol as a reducing agent is the low reaction rate at low acidities. In order to obtain high acidity, the electrolyses of chlorate to chloric acid can be run to a high degree of conversion which, however, has been found to decrease the current efficiency. Production of chlorine dioxide at low acidities requires high methanol concentration.

Another draw back of using methanol, particularly when it is used at high concentrations, is the formation of organic by-products such as formaldehyde and formic acid. Also some of the methanol leaves the reactor without having participated in the reduction, and the corresponding ether and ester are there as well. A chlorate solution containing the above impurities may cause damage to an electrochemical cell and it is therefore desirable to recrystallize and redissolve the recycling alkali metal chlorate before it enters the electrochemical cell, as described in the examples of the above mentioned WO 92/03374.

SUMMARY OF THE INVENTION

The present invention aims at solving the problem of providing a process of producing chlorine dioxide without any undesired by-products, the process being efficient also at low acidities. The invention also aims at solving the problem of providing a process of producing chlorine dioxide from chloric acid and alkali metal chlorate which is efficient at low concentrations of chloric acid. The invention also aims at solving the problem of providing a process of producing chlorine dioxide from chloric acid and alkali metal chlorate, in which process alkali metal chlorate leaving the chlorine dioxide reactor can be introduced directly into an electrochemical cell.

DETAILED DESCRIPTION OF THE PREFERRED EMBODIMENTS

The above problems have been solved by the method of producing chlorine dioxide according to the claims. More specifically, the method comprises reacting chloric acid with hydrogen peroxide as a reducing agent, in such proportions that chlorine dioxide is produced, in a preferably aqueous reaction medium which preferably is maintained at an acidity within the range from about 0.5N to about 12N, preferably from about 0.5 to about 7N, most preferably from about 1 to about 4N, and suitably at a temperature from about 15° to about 100° C., preferably from about 30° to about 100° C. A mixture of chlorine dioxide and oxygen is withdrawn from the reaction medium. The reaction is described by the following equation:

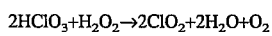

$$2HClO_3 + H_2O_2 \rightarrow 2ClO_2 + 2H_2O + O_2$$

The chloric acid can be prepared with any method, for example ion exchange, electrolyses or combinations thereof. The hydrogen peroxide is preferably added in an amount from about 0.1 to about 1, most perferably from about 0.4 to about 0.7 mols per mol chlorine dioxide produced.

Using hydrogen peroxide as a reducing agent for producing chlorine dioxide from alkali metal chlorate is known from European patent applications EP-A1-0473559 and EP-A1-0473560 (corresponding to U.S. Pat. Nos. 5,091,166 and 5,091,167). However, hydrogen peroxide has never been used as a reducing agent for producing chlorine dioxide from chloric acid.

The reaction between chloric acid and hydrogen peroxide is very rapid even at as low acidities as 1–2N. The reaction is considerably faster than the corresponding reaction in other systems for chlorine dioxide production, such as the chloric acid—methanol system or the sodium chlorate—hydrogen peroxide—sulfuric acid system. Further, no detrimental by-products are obtained, such as salt by-products formed when alkali metal chlorate is used as a raw material and organic by-products formed when methanol is used as a reducing agent. On the other hand, oxygen is obtained as a valuable be-product which is particularly advantageous in paper mills where oxygen is used as a bleaching agent or in biological treatment of waste water. Further, it is possible to produce essentially chlorine-free chlorine dioxide.

According to one embodiment of the invention, the reaction medium for chlorine dioxide generation is supplied with an aqueous solution of chloric acid, the reaction being performed in the substantial absence of alkali metal chlorate, thus minimizing the water load of the system. The solution supplied preferably contains from about 10 to about 40% by weight of chloric acid, most preferably from about 15 to about 25% by weight of chloric acid, the balance preferably substantially being water. At too high concentration the chloric acid is unstable. In addition to chloric acid and water, the solution may contain small amounts of stabilizers and/or other additives.

In many methods of producing chloric acid, an aqueous solution containing a mixture of chloric acid and alkali metal chlorate is obtained. A preferred embodiment of the invention involves supplying the reaction medium for chlorine dioxide generation with a solution containing chloric acid and alkali metal chlorate. The solution containing chloric acid and alkali metal chlorate is preferably produced by an electrochemical process, such as the one described in the earlier mentioned WO 91/12356, and the solution obtained can be fed directly into the chlorine dioxide reactor. At least in processes run under sub-atmospheric pressure, it is possible to increase the acidity by adding also an mineral acid such as sulfuric acid, thus obtaining less of a salt cake by-product than in conventional processes without chloric acid. Mineral acids can be supplied in an amount sufficient for substantially all chlorate to react. However, the reaction is preferably performed in the substantial absence of sulfuric acid, and most preferably in the substantial absence of any mineral acid other than chloric acid, thus avoiding the formation of any salt by-products. Unreacted alkali metal chlorate is withdrawn from the reaction medium and can be reused. The solution supplied to the reaction medium preferably contains from about 10 to about 40% by weight, most preferably from about 15 to about 25% by weight of chloric acid. The molar ratio $M^+:H^+$, M being an alkali metal such as sodium, potassium or mixtures thereof, can be from almost 0 up to about 10 or more, preferably from about 1.5 to about 6. Thanks to the high reaction rate at low acidities, the process works efficiently even at a very low content of chloric acid.

A particularly preferred embodiment of the invention relates to an integrated process which comprises electrolysing an aqueous solution of alkali metal chlorate so to obtain a solution containing chloric acid and alkali metal chlorate, feeding the solution to the reaction zone in a chlorine dioxide reactor, producing chlorine dioxide by reacting the chloric acid with hydrogen peroxide as a reducing agent, withdrawing the unreacted alkali metal chlorate from the reaction zone, preferably in the form of an aqueous solution, and recycling it to the electrochemical cell, which cell preferably also is supplied with fresh alkali metal chlorate. The fresh alkali metal chlorate can be added to the recycling stream of chlorate or directly to the electrochemical cell.

The alkali metal chlorate withdrawn from the chlorine dioxide generating reaction zone can be purified before it is supplied to the electrochemical cell. However, the use of hydrogen peroxide for the chlorine dioxide production, involves the advantage that no organic by-products are obtained. The solution withdrawn from the reaction zone only contains alkali metal chlorate, some unreacted chloric acid, and possibly small amounts of hydrogen peroxide and chlorine dioxide. Chloric acid causes no harm to electrochemical cells, and hydrogen peroxide and chlorine dioxide are simple to remove, for example by stripping. Although possible, sophisticated purification steps such as crystallization and redissolving are normally not required. If the process it set properly, the content of peroxide chlorine dioxide is so low that the chlorate solution recycled normally can be directly introduced into the electrochemical cell without any purification or other kind of treatment.

Since chlorine dioxide can be efficiently produced from a feed stream having comparatively low content of chloric acid, the degree of conversion in the electrochemical cell can be kept low, thus increasing the current efficiency. The suitable degree of conversion depends on the electrochemical cell used. In most known cells using standard electrodes and polymeric membranes, such as the one described in the previously mentioned WO 91/12356, the preferred degree of conversion is from about 10 to about 50%, most preferably from about 20 to about 40%. However, the optimal degree of conversion can be higher in other kinds of cells, for example cells using gas electrodes such as hydrogen generating electrodes or cells using high ion conducting membranes such as ceramic membranes. The optimal degree of conversion can be up 70% or even 90% or more if the electrochemical cell used is very effective.

According to the invention, all known chlorine dioxide processes can be modified by using hydrogen peroxide as the reducing agent, replacing at least part of the alkali metal chlorate with chloric acid and, optionally, excluding other mineral acids. Processes run at a normal pressure as well as reduced pressure processes are equally suitable. The invention can be used in batch processes or in continuous processes. All known types of reactors can be used e.g. SVP$^{(R)}$ reactors or Mathieson reactors and others.

The chlorine dioxide production can be run in a conventional manner. As an example, a process for a single vessel process run with subatmospheric pressure is described, which, however, is not to be seen as a restriction of the invention. The production of chlorine dioxide according to this embodiment is performed in a single reaction vessel, generator—evaporator—crystallizer. A suitable reactor is an SVP$^{(R)}$. The reactants are added continuously to the reactor. Chloric acid and optionally alkali metal chlorate are added in an amount to provide a chlorate (i.e. $ClO_3^-$) concentration in the reaction vessel which can vary within wide limits, from a low concentration of about 1M or less up saturation which normally is about 6M. The preferred concentration is from about 2M up to about 5M. The acidity of the reaction medium can be within the whole range from 0.5 to 12N. It is preferred to run the reaction at an acidity below 5N, most preferably below 4N. The acidity is preferably provided with chloric acid only, but addition of other mineral acids is possible. If chloric acid is the only acid present, the alkali metal supplied is withdrawn as alkali metal chlorate which can be transferred to an electrochemical cell for at least partial conversion to chloric acid. If other mineral acids, for example sulfuric acid, is present, alkali metal can be withdrawn as a salt cake, for example alkali metal sulfate. Hydrogen peroxide is preferably added in an amount from about 0.4 to about 0.7 mols per mol of chlorine dioxide produced. The reaction is preferably operated at a temperature of 50°–100° C., most preferably 50°–75° C. and at a pressure below atmospheric pressure, suitably at 60–400 mm Hg. The reaction medium boils and water is evaporated in a sufficient amount to dilute the chlorine dioxide formed to a safe concentration.

Although not necessary, an addition of a small amount of chloride ions can be appropriate, preferably in the form of alkali metal chloride, so as to maintain the concentration thereof in the reactor within the range from 0.001 and up to 0.8 moles per liter.

In order to increase the reaction rate, it is also possible to supply the reaction medium with one or more compounds selected from the group consisting of urea and phosphonic acid based complexing agents. The effective amount of the compound to be added suitably lies within the range 0.01–5 per cent by weight (based on total amount of hydrogen peroxide), preferably within 0.05–2, most preferably within 0.1–1 per cent by weight. The compound can be added as a solution directly to the reactor or it can be added together with the hydrogen peroxide solution. The phosphonic acids suitably used are mainly diphosphonic acids and polyphosphonic acids produced from ammonia or ethyleneamines which are commercially available compounds. For example, the following compounds can be used: 1-hydroxyethylidene-1,1-diphosphonic acid, 1-aminoethane-1,1-diphosphonic acid aminotri(methylenephosphonic acid), ethylene diaminetetra(methylenephosphonic acid), hexamethylene diaminetetra(methylenephosphonic acid), diethylenetriaminepenta(methylenephosphonic acid). The last one mentioned is particularly preferred.

In addition to hydrogen peroxide, it is also possible to add other reducing agents such as methanol, formaldehyde, formic acid, alcohols, sulfur dioxide and chloride. Catalyst such as silver, manganese, vanadium, molybdenum. palladium and platinum can also be added if appropriate.

The method according to the invention is not restricted to any of the alkali metals, but sodium is the most preferred one.

The invention is further illustrated by means of the following example.

EXAMPLE

Chlorine dioxide was produced in a reactor working continuously with an effective reaction volume of 300 ml. A first aqueous solution of sodium chlorate and chloric acid, and a second aqueous solution of hydrogen peroxide, were fed to the reactor, each with a flow of 10 ml/min. Nitrogen was bubbled trough the reactor to provide agitation and to dilute the chlorine dioxide produced. The reactor was run under slight vacuum, 380 mm Hg. In experiment 1, the first solution contained 5M $ClO_3^-$ and 2M $H^+$, and the second solution contained 0.1M $H_2O_2$. In experiment 2, the first solution contained 6M $ClO_3^-$ and 2M $H^+$, and the second solution contained 0.3M $H_2O_2$. In experiment 3, the first solution contained 6M $ClO_3^-$ and 3M $H^+$, and the second solution contained 0.3M $H_2O_2$. The conditions in the reaction medium and the products obtained In the different experiments appear In the table below:

| Exp. No. | T °C. | $[H_2O_2]$ M | $[ClO_3^-]$ M | $[H^+]$ M | $ClO_2$ rate M/min × $10^{-5}$ |
|---|---|---|---|---|---|
| 1 | 50 | 0.13 | 4.5 | 1.6 | 19.2 |
| 2 | 50 | 0.37 | 5.5 | 1.4 | 141.7 |
| 3 | 70 | 0.18 | 4.8 | 2.1 | 2233.3 |

What is claimed is:

1. A method for producing chlorine dioxide, comprising the steps of:
    (a) feeding chloric acid and hydrogen peroxide as a reducing agent to a reaction medium in the substantial absence of mineral acids other than chloric acid and in the substantial absence of alkali metal ions, and
    (b) reducing the chloric acid to chlorine dioxide.

2. A method as claimed in claim 1, wherein the reaction is performed in a reaction medium which is maintained at an acidity within the range from about 0.5 to about 12N.

3. A method as claimed in claim 1, wherein the reaction medium is maintained at a temperature from about 15° to about 100° C.

4. A method as claimed in claim 1, wherein the reaction medium is supplied with one or more compounds selected from the group consisting of urea and phosphonic acid based complexing agents.

5. A method as claimed in claim 1, wherein said method produces essentially chlorine-free chlorine dioxide.

6. A method for producing chlorine dioxide, comprising the steps of:
    (a) electrolyzing an aqueous solution of alkali metal chlorate in an electrochemical cell to obtain a solution containing chloric acid and alkali metal chlorate,
    (b) feeding the solution to a reaction zone in a chlorine dioxide reactant,
    (c) producing chlorine dioxide by reacting the chloric acid with hydrogen peroxide as a reducing agent and in the substantial absence of a strong mineral acid other than chloric acid,
    (d) withdrawing the unreacted alkali metal chlorate from the reaction zone, and
    (e) recycling the unreacted chlorate to the electrochemical cell.

7. A method as claimed in claim 6, wherein said method produces essentially chlorine-free chlorine dioxide in said reaction zone.

8. A method as claimed in claim 6, wherein the unreacted alkali metal chlorate recycled from the chlorine dioxide generation is introduced into the electrochemical cell without purification.

* * * * *